United States Patent [19]

MacMillan John H. et al.

[11] 4,430,489

[45] Feb. 7, 1984

[54] ONE-PACKAGE, HEAT-CURABLE SEALANT COMPOSITIONS COMPRISING A BLOCKED POLYISOCYANATE AND A BLOCKED POLYAMINE

[75] Inventors: MacMillan John H., Ambler; Eugene R. Bertozzi, Yardley; Bruce E. Streeter, Morrisville, all of Pa.

[73] Assignee: Thiokol Corporation, Chicago, Ill.

[21] Appl. No.: 372,587

[22] Filed: Apr. 28, 1982

[51] Int. Cl.³ .............................................. C08G 18/80
[52] U.S. Cl. ...................................................... 528/45
[58] Field of Search ............................................ 528/45

[56] References Cited

U.S. PATENT DOCUMENTS

| | | | |
|---|---|---|---|
| 2,801,990 | 8/1957 | Seeger et al. | 528/45 |
| 3,267,078 | 8/1966 | Damusis | 528/45 |
| 3,621,000 | 11/1971 | Schmelzer et al. | 528/45 |
| 3,721,647 | 3/1973 | Mazzeo et al. | 528/45 |
| 3,791,910 | 2/1974 | Bowser | 252/194 |
| 4,246,369 | 1/1981 | McGinniss et al. | 525/126 |
| 4,248,978 | 2/1981 | de Cleur et al. | 525/124 |

*Primary Examiner*—Maurice J. Welsh
*Attorney, Agent, or Firm*—Gerald K. White

[57] ABSTRACT

Formulations comprising two or more reactants in which each reactant is blocked to render it unreactive at temperatures below 100° C. are disclosed. These formulations have utility in the fields of one package insulating glass sealant compositions, high solids coatings, and reaction injection molding.

12 Claims, No Drawings

ONE-PACKAGE, HEAT-CURABLE SEALANT COMPOSITIONS COMPRISING A BLOCKED POLYISOCYANATE AND A BLOCKED POLYAMINE

BACKGROUND OF THE INVENTION

This invention relates broadly to compositions containing two or more reactive components which must not co-react until raised to above 100° C., and which then must co-react rapidly. These compositions have utility in various fields, including the field of sealant compositions, the field of high solids coatings, and the field of reaction injection molding.

In the field of sealant compositions the invention relates, inter alia, to one package heat-curable compositions useful for sealing insulating glass.

The term "insulated glass" broadly refers to a structure comprising panes of glass, the faces of which are in spaced relationship, thereby providing between the glass panes a space which imparts insulating properties to the structure. In its most widely use form, 2 parallel panes of glass are positioned in spaced relationship by metallic spacers positioned around the perimeters of the panes, and indented a short distance from the edges of the panes, thereby forming a U-shaped channel in which the legs of the U comprise the interior surface edges of the panes and the base of the U comprises a side of the spacer. Typically, the spacer is a hollow member filled with a water-absorbent material, for example, a molecular sieve, to keep the enclosed air space between the glass panes dry. In such a structure, the aforementioned U-shaped channel is filled with a sealant, generally a polymeric composition, which must have a combination of properties for satisfactory use.

The sealant must have a very low water vapor transmission (WVT) rate so that moisture is prevented from entering the dry space between the panes of glass. The presence of moisture in the space tends to reduce the insulating value thereof. Moisture in the space can also condense on the panes of glass and create visibility or aesthetic problems. If the sealant does not have a satisfactory low WVT rate, the capacity of the water-absorbent material in the hollow spacer will be exceeded, and moisture will find its way into the space.

The sealant should form an excellent bond with glass which is not degraded over long periods of time under normal conditions of use, which generally include exposure to sunlight, moisture, and large changes in temperature.

Furthermore, the sealant itself should not be a source of material which enters the space between the panes of glass. Should one or more constituents comprising the sealant volatize into the space, fogging, often referred to as "chemical fogging" of the glass panes, may result.

Temperature variation will tend to cause contraction and expansion of the insulated glass structure. Therefore, the sealant should have an elongation of at least 100%, and preferably an elongation of at least 200%.

The sealant should also resist degradation due to contact with conventional caulks and putties.

Sealant compositions may be classified either as "two package" or "one package" formulations. The two package sealants store their reactants in separate packages which are mixed together immediately prior to application, thereby avoiding premature cure problems. However, in some applications, the premixing requirement is a decided commercial disadvantage which "one package" sealant formulations have attempted to overcome.

One package sealant formulations store all their reactants in a single package. Such a formulation must be indefinitely stable at room temperature or in the absence of moisture of air. These sealants should not cure during "hot storage" at 38° C. (100° F.). These reactants will be "activated," or begin to cure, upon exposure to more elevated temperature (100°–200° C.) or ambient moisture or air. The ideal sealant formulation will continue to cure upon removal of the activation.

"Blocking" of reactive functional groups with an inert derivative during organic synthesis is a well known synthetic tool. Once the desired synthetic transformation has been achieved the blocking agent is liberated, thereby regenerating the original reactive functional group. Removal of the blocking agent may be achieved by chemical reaction, and often by thermal dissociation at elevated temperature.

A "blocked isocyanate" is a compound which contains no free isocyanate groups, but which, though relatively inert at room temperature, will react at elevated temperatures in a manner which is similar to that of a free isocyanate. The formation of such compounds from isocyanates may be illustrated by the equation

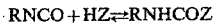

$$RNCO + HZ \rightleftharpoons RNHCOZ$$

The blocking agents (HZ) should have threshold dissociation temperatures of 80°–130° C., thereby ensuring total blockage of the isocyanate groups at ambient temperature and total dissociation at typical extrusion temperatures. Typical blocking agents include such compounds as phenols and thiols, tertiary alcohols, secondary aromatic amines, sodium bisulfite, imides, and 1,3-dicarbonyl compounds.

One example of a conventional one package sealant formulation system employs an isocyanate-terminated polymer and a curing agent, typically an alcohol or amine. Premature reaction between the isocyanate-terminated polymer and the curing agent is prevented by blocking the isocyanate groups with a thermal dissociation blocking agent.

Once unblocked, the free isocyanate will react with the curing agent. However, the rate of reaction is often unacceptable slow for commercial application. Addition of a Lewis acid catalyst, such as a tin salt, may greatly increase the reaction rate. However, coordination of the Lewis acid with the carbonyl group of the blocked isocyanate often allows direct attack of the curing agent on the blocked terminal, resulting in room temperature cure. Certain curing agents, such as aliphatic or aromatic di- or polyamines do react rapidly with the isocyanate. However, these compounds are sufficiently basic to attack the blocked isocyanate terminal, thereby resulting in room temperature cure over several hours.

N. Seeger, "Synthetic Elastomeric Isocyanate Modified Polymers And Method For Their Preparation," U.S. Pat. No. 2,801,990 Aug. 6, 1957), discloses the substituted urea reaction products of a polyisocyanate and an elastomeric diisocyanate-modified polyester or polyesteramide. The poly-isocyanate reactivity is controlled by blocking at least one but not all the isocyanate groups with a thermal dissociation blocking agent. The number of isocyanate groups which are blocked may be controlled by adjusting the molecular proportions of polyisocyanate and blocking agent employed to block the polyisocyanate.

G. Bowser, "Multiple Glazed Unit," U.S. Pat. No. 3,791,910 (Feb. 12, 1974), discloses a two package insulating glass sealant formulation composed of butyl rubber, polyisobutylene, polybutene, silica pigment with hydroxy groups, lead dioxide, and paraquinone dioxime. A two package formulation is required because the composition will cure slowly at room temperature. The sealant will attain a substantially full cure in about two weeks.

V. McGinniss et al, "Compositions Containing Carbamothioate Curing Agents And Their Uses," U.S. Pat. No. 4,246,369 Jan. 20, 1981), discloses temperature-sensitive carbamothiolic acid esters. At temperatures from 100° to 250° C. these compounds dissociate into free isocyanates and free thiols. The carbamothioate curing agents are employed in conjunction with a compound "A" which is reactive with isocyanate and a compound "B" which is reactive with thiol.

E. de Cleur et al, "Pulverulent Coating Compositions," U.S. Pat. No. 4,248,978 (Feb. 3, 1981), discloses a stable pulveruluent coating composition which consists of a monomer which has reactive hydroxyl, carboxyl, mercapto, amino, amide, urethane, urea, or thiourea groups and a blocked polyisocyanate compound having at least one uretone imine group per molecule.

DESCRIPTION OF THE INVENTION

The applicants' inventive concept is to block all the reactive groups in a formulation. In this way all the reactive components may be formulated in one package and stored for long periods of time without appreciable interaction. Blockage of all reactants allows the use of more highly reactive compounds than is currently possible in formulations which block only one component.

Three applications of the applicants' invention are in the fields of one package insulating glass sealant compositions, high solids coatings (both powder and wire), and reaction injection molding (RIM) of thermosetting resins. The remainder of this application will illustrate the applicants' invention as applied to one package insulating glass sealant compositions.

As applied to insulating glass sealant compositions, the applicants' inventive concept is to block both the prepolymer and the curing agent. The blockage of both reactants allows a stable one package sealant formulation. Blockage of the curing agent allows use of highly reactive curing agents which, when unblocked at elevated temperature, react rapidly with the free prepolymer. Blockage of the prepolymer ensures room temperature stability by rendering the prepolymer non-reactive not only to the free curing agent but also to moisture and other potential sources of instability.

A specific embodiment of the applicants' invention may be illustrated by describing its application to a one package insulating glass sealant composition in which the prepolymer has an isocyanate group at each end, and is cured with a diamine compound. In order to achieve rapid cure times the use of strongly basic amine curing agents is desirable. However, these strongly basic curing agents can attack blocked isocyanate terminals at room temperature, thereby precluding their use in conventional one package insulating glass sealant compositions. Blockage of the diamine curing agent allows use of strongly basic amines which, when unblocked at elevated temperatures, react rapidly with the free isocyanate. Blockage of the isocyanate-terminated prepolymer avoids moisture sensitivity and potential instability of the free isocyanate-terminated prepolymer.

Obviously, the applicants' invention may be applied to other one package sealant compositions in which the prepolymer is not isocyanate-terminated and the curing agent is not a polyamine. For example, the present invention also pertains to one package sealant compositions in which the prepolymer is terminated with amine groups and the curing agent is a polyisocyanate. All that is required is that both reactants be blocked.

The isocyanate-terminated prepolymer should provide the cured sealant composition with the physical properties discussed above: low water vapor transmission, excellent glass adhesion, low volatility, and good elongation. Suitable prepolymers include isocyanate-terminated polysulfides and isocyanate-terminated vinylic polymers, especially thioether-modified vinylic polymers.

Suitable isocyanate-terminated vinylic polymers may be prepared from hydroxyl-terminated polybutadiene and hydroxyl-terminated polyisoprene. These prepolymers may themselves be prepared by free radical addition polymerization of their respective monomers, 1,3-butadiene and 2-methyl-1,3-butadiene. Hydroxyl-terminated polybutadiene is commercially available as ARCO®R45M from the Arco Chemical Company, 1500 Market Street, Philadelphia, Pa. 19101.

The hydroxyl-terminated prepolymer is reacted with a diisocyanate to form the isocyanate-terminated prepolymer. A one to one molar ratio of hydroxyl to diisocyanate is required to ensure that the prepolymer is only "capped" with a isocyanate group on each end, rather than forming a polyurethane composed of many isocyanate and vinyl prepolymer segments.

Suitable diisocyanates for use in the preparation of the isocyanate-terminated prepolymer include ethylene diisocyanate, trimethylene diisocyanate, tetramethylene diisocyanate, hexamethylene diisocyanate, toluene diisocyanate, m-phenylene diisocyanate, p-phenylene diisocyanate, isophorone diisocyanate, and 4,4'-diphenylene methane diisocyanate.

The isocyanate blocking agent should produce essentially irreversible blocking at room temperature, with a threshold dissociation temperature of at least 80° C. and preferably over 100° C. The following isocyanate blocking agents may be employed in the practice of the invention:

1. Tertiary alcohols such as tertiary butyl alcohol, tertiary amyl alcohol, dimethyl ethinyl carbinol, dimethyl phenyl carbinol, methyl diphenyl carbinol, triphenyl carbinol, 1-nitro tertiary butyl carbinol, 1-chloro tertiary butyl carbinol, and triphenyl silanol;
2. Secondary aromatic amines which contain only one group having a hydrogen reactive with an isocyanate group, such as the diaryl compounds, including diphenyl amine, o-ditolyl amine, m-ditoyl amine, p-ditolyl amine, N-phenyl toluidene, N-phenyl xylidine, phenyl alpha naphthyl amine, phenyl beta naphthyl amine, carbazole, and the nuclear substituted aromatic compounds such as 2,2'-dinitro diphenyl amine and 2,2'-dichloro diphenyl amine;
3. Mercaptans such as 2-mercaptobenzothiazole, 2-mercapto thiazole, ethyl 2-mercapto thiazole, dimethyl 2-mercapto thiazole, beta naphthyl mercaptan, alpha naphthyl mercaptan, phenyl 2-mercapto thiazole, 2-mercapto 5-chloro-benzothiazole, methanethiol, ethanethiol, propanethiol, butanethiol, dodecanethiol, and ethinyl dimethyl thiocarbinol;
4. Lactams such as epsilon-caprolactam, delta-valerolactam, gamma-butyrolactam, and beta-propiolactam;
5. Imides such as carbimide, succinimide, phthalimide, naphthalimide, and glutarimide;
6. Monohydric phenols in which the hydroxyl group is the only group containing hydrogen reactive with the isocyanate group, such as phenol, the cresols, the xylenols, the trimethyl phenols, the ethyl phenols, the propyl phenols, the chloro phenols, the nitro phenols, the thymols, the carvacrols, mono alpha phenyl ethyl phenol, di alpha phenyl ethyl phenol, tri alpha phenyl ethyl phenol, and tertiary butyl phenol;
7. Compounds containing enolizable hydrogen such as aceto-acetic ester, diethyl malonate, ethyl n-butyl malonate, ethyl benzyl malonate, acetyl acetone, acetonyl acetone, benzimidazole, and 1-phenyl-3-methyl 5-pyrazolon.
8. Ketoximes including methyl ethyl ketoxime and acetophenone ketoxime.

The mercaptans are preferred as the polyisocyanate blocking agent due to cost and toxicity considerations.

The polyamine curing agent must be sufficiently basic so as to rapidly cure the free isocyanate at temperatures above 130° C. The polyamine curing agent may be alkyl, alkoxy, or aryl of from 1 to 20 carbon atoms. Effective polyamine curing agents include ethylene diamine, hexamethylene diamine, and bis(p-aminocyclohexyl)methane. Ethylene diamine is preferred due to cost considerations.

A "blocked amine" is a compound which contains no free amino groups, but which, though relatively inert at room temperature, will react at elevated temperatures in a manner which is similar to that of a free amine. The formation of such compounds from amines may be illustrated by the equation $$RNH_2 + HZ \rightleftharpoons RNH_3^\oplus + Z^\ominus$$

The polyamine blocking agent should produce essentially irreversible blocking at room temperature, with a threshold dissociation temperature above 100° C. The polyamine blocking agent should possess low volatility to prevent bubbling or frothing during cure. Alkyl or aryl mono or polycarboxylic acids of from one to 30 carbon atoms may be employed as the polyamine blocking agent. Monocarboxylic acids are preferred since they allow one to one stoichiometry. Saturated carboxylic acids are further preferred due to their superior thermal stability. Effective polyamine blocking agents include stearic and oleic acids.

Inorganic acids may also be employed as the polyamine blocking agent. Suitable inorganic acids include sodium bisulfite, sodium bisulfate, p-toluene sulfonic acid, and sulfamic acid.

Combinations of two or more polyamine blocking agents may be employed to achieve optimum insulating glass composition characteristics or to lower the cost of the polyamine blocking agent.

Conventional additives may be incorporated into the insulating glass sealant formulation to achieve optimum sealant performance. Typically such additives include plasticizers, glass adhesion promoters, antioxidants, reinforcing fillers, dyes, and pigments.

Suitable plasticizers include low volatility phthalates and low volatility chlorinated hydrocarbon polymers. Suitable phthalates include benzyl phthalate and alkyl benzyl phthalates. Chlorinated hydrocarbon plasticizers suitable for use are paraffins or -olefins containing from 16 to 20 carbon atoms which are chlorinated to a final chlorine content of from 52 to 58 weight percent chlorine, and blends thereof. These plasticizers may be included in the sealant formulation in an amount ranging from zero to thirty percent by weight based upon the total composition weight.

Suitable glass adhesion promoters are the organoalkoxysilanes such as gamma-glycidoxypropyl trimethoxysilane, gamma-aminopropyl triethoxysilane, n-bis(beta-hydroxyethyl) gamma-aminopropyl triethoxysilane, and N-beta(aminoethyl) gamma-aminopropyl trimethoxysilane. They may be incorporated in the sealant formulation in an amount ranging from 0.5 to four percent by weight based on the total composition weight. Gamma mercaptopropyltrimethoxysilane is commercially available as A-189 from the Union Carbide Co.

Reinforcing fillers include carbon black, silica, talc, titanium dioxide, zinc sulfide, calcium silicate, calcium carbonate, calcium oxide, and hydrated aluminum. A neutral or acidic filler is preferred so as to eliminate any possibility of premature deblocking. These fillers may be incorporated into the sealant formulation in an amount ranging from twenty to seventy percent by weight based upon the total composition weight.

The examples which follow are intended to illustrate the practice and advantage of the applicants' invention, and are not intended to limit the scope of the invention in any way. All percentages are measured by total weight of the composition unless otherwise stated.

EXAMPLE I

Blocking Of An Isocyanate-terminated Prepolymer With N-Dodecanethiol 339.5 grams of isocyanate-terminated polybutadiene, which had previously been partially saturated (5 mole percent) with n-dodecanethiol, were heated under nitrogen at 95° C. and mixed with 54.8 grams of n-dodecanethiol and one gram of triethylamine catalyst. After 18 hours of heating, chemical and infrared analysis of the reaction product indicated no isocyanate groups were present.

The dodecanethiol-blocked prepolymer prepared above was denominated prepolymer "A."

EXAMPLE II

Blocking Of An Isocyanate-terminated Prepolymer With Phenol 59.4 grams of isocyanate-terminated polybutadiene, which had previously been partially saturated (5 mole percent) with n-dodecanethiol, were heated under nitrogen at 70° C. and mixed with 3.1 grams of phenol. After eleven hours of heating, chemical and infrared analysis of the reaction product indicated that no isocyanate groups were present.

The phenol blocked prepolymer prepared above was denominated prepolymer "B."

EXAMPLE III

Formulation Of A Conventional One Package Heat Curable Composition Employing N-Dodecanethiol-Blocked Prepolymer And A Non-Blocked Diol Curing Agent 80.02 grams of prepolymer "A" were thoroughly mixed with 11.41 grams of POLYCIN ®53*, in a plastic beaker. The composition so prepared was divided into six samples.

*POLYCIN®53 is a diol derivative of ricinoleic acid (cis-12-hydroxyoctadec-9-enoic acid). It is commercially available from CasChem, Inc., Bayonne, NJ 07002.

Cure of the first sample required 23 hours at 150° C., which is much too slow for commercial application.

Dibutyltindiactate (DBTDA), a cure accelerator, was added to three samples in an amount corresponding to 0.4%, 2%, and 5% by weight, respectively. The three samples were then heated to 150° C. The 0.4% DBTDA sample required 24 hours to cure. The 2% DBTDA sample required about 2 hours to cure, while the 5% DBTDA sample required about an hour.

Dibutyltindiacetate was added to the remaining two samples in an amount corresponding to 5% by weight. Both samples were heated to 195° C. One sample cured in about thirteen minutes, but displayed foaming and bubbles in the cured sealant. The other sample cured in about twenty three minutes without exhibiting any swelling or bubbles.

EXAMPLE IV

Formulation Of A Conventional One Package Heat Curable Composition Employing A Phenol-Blocked Prepolymer And A Non-Blocked Diol Curing Agent 7.19 grams of prepolymer "B" were thoroughly mixed with 0.79 grams of POLYCIN®53 in a plastic beaker. The composition was placed in a two inch square sheet mold and heated to 145° C. The composition required 8 hours to cure. The cured composition had a Shore A hardness of 25 and an elongation of 120.

7.75 grams of prepolymer "B", 0.85 grams of POLYCIN®53, and an amount of dibutyltindiacetate (DBTDA) cure accelerator corresponding to 0.2 weight percent were thoroughly mixed. The composition was placed in a two inch square sheet mold and heated to 145° C. Cure required thirty minutes. The cured composition had a Shore A hardness of 30, but poor elongation (approximately 70%).

EXAMPLE V

Formulation Of A Conventional One Package Heat Curable Composition Employing Phenol-Blocked Prepolymer And Non-Blocked Hexamethylene Diamine As The Curing Agent 5.61 grams of prepolymer "B" were thoroughly mixed in a plastic beaker with 0.56 grams of xylene to decrease viscosity. Then 0.170 grams of hexamethylene diamine were added to the reaction mixture, which cured the prepolymer immediately.

EXAMPLE VI

Formulation Of A Conventional One Package Heat Curable Composition Employing N-Dodecanethiol-Blocked Prepolymer And Non-Blocked Hexamethylene Diamine As The Curing Agent 25.69 grams of prepolymer "A" and 1.02 gram of hexamethylene diamine were thoroughly mixed in a plastic beaker. A sample required twelve minutes to cure at 150° C., and displayed a Shore A hardness of 65.

A sample maintained at room temperature cured within two hours.

EXAMPLE VII

Formulation Of A Conventional One Package Heat Curable Composition Employing N-Dodecanethiol-Blocked Prepolymer And Non-Blocked Amine-Terminated Polysulfide As The Curing Agent 74.8 grams of prepolymer "A" and 126.3 grams of amine-terminated liquid polysulfide were mixed in a plastic beaker, forming a white suspension. A sample heated to 150° C. cured on the sealant surface only. A sample heated to 195° C. cured in approximately one hour. Table I summarizes the various deficiencies of conventional one package heat curable compositions, as represented by Examples III through VII:

TABLE I

| Example | Isocyanate Blocking Agent | Curing Agent | Room Temp. Stability | Time to cure |
|---|---|---|---|---|
| III A | N—Dodecanethiol | POLYCIN ® 53* | good | 23 hours at 150° C. |
| III B | N—Dodecanethiol | POLYCIN ® 53/0.4% DBTDA** | | 24 hours at 150° C. |
| III C | N—Dodecanethiol | POLYCIN ® 53/2% DBTDA | | 2 hours at 150° C. |
| III D | N—Dodecanethiol | POLYCIN ® 53/5% DBTDA | | 1 hour at 150° C. |
| III E | N—Dodecanethiol | POLYCIN ® 53/5% DBTDA | | 13 min. at 195° C. |
| III F | N—Dodecanethiol | POLYCIN ® 53/5% DBTDA | | 23 min. at 195° C. |
| IV A | Phenol | POLYCIN ® 53 | good | 8 hours at 145° C. |
| IV B | Phenol | POLYCIN ® 53/0.2% DBTDA | good | 30 min. at 145° C. |
| V | Phenol | Hexamethylene Diamine | immed. cure | — |
| VI | N—Dodecanethiol | Hexamethylene Diamine | 2 hours | 12 min. at 150° C. |
| VII | N—Dodecanethiol | Amine Terminated Sulfide | good | 1 hour at 195° C. |

*POLYCIN ® 53 is a diol-terminated derivative of ricinoleic acid (cis-12-hydroxyoctadec-9-enoic acid), available from the Baker Castor Oil Company, Bayonne, New Jersey 07002.
**Dibutyltindiacetate, used as a cure accelerator.

EXAMPLE VIII

Formulation Of A One Package Heat Curable Composition Employing N-Dodecanethiol Blocked Prepolymer And Hexamethylene Diamine Blocked With Oleic Acid 25.65 grams of prepolymer "A" were thoroughly mixed with 4.97 grams of oleic acid (cis-9-octadecenoic acid) in a plastic beaker. 1.02 grams of hexamethylene diamine, previously liquified by heating to 70° C., were added to the plastic beaker. The mixture was thoroughly and rapidly mixed. A white color signalled the formation of the blocked diamine, hexamethylene diammonium dioleate.

A sample heated to 150° C. required less than ten minutes to cure. The cured composition had a Shore A hardness of about 30, and displayed no foaming during cure.

An uncured sample displayed promising "hot storage" stability by remaining in the uncured state for over three weeks at 38° C. (100° F.).

EXAMPLE IX

Formulation Of A One Package Heat Curable Composition Employing N-Dodecanethiol Blocked Prepolymer And Hexamethylene Diamine Blocked With Stearic Acid 23.01 grams of prepolymer "A" were warmed and poured into a plastic beaker. 4.53 grams (corresponding to 10% excess) of hot liquified stearic acid (n-octadecanoic acid) were added to the beaker. The mixture was stirred vigorously while heating to dissolve the stearic acid.

0.86 gram of warm liquified hexamethylene diamine was added to the beaker, and the mixture vigorously stirred. A milky suspension signalled the formation of the blocked diamine, hexamethylene diammonium distearate.

A sample heated to 150° C. required 8 minutes to cure. The cured composition had a Shore A hardness of 45, a minimal non-offensive odor, and showed no foaming.

An uncured sample displayed good "hot storage" stability. It remained uncured after six weeks at 38° C. (100° F.).

EXAMPLE X

Formulation Of A One Package Heat Curable Composition Employing N-Dodecanethiol-Blocked Prepolymer And Hexamethylene Diamine Blocked With Isostearic Acid 34.48 grams of prepolymer "A" were thoroughly mixed with 6.63 grams (a five percent excess) of isostearic acid* in a plastic beaker. The reaction mixture was warmed to facilitate solution. 1.28 grams of warm, liquified hexamethylene diamine were added to the reaction mixture which was then mixed thoroughly. A milky suspension signalled the formation of the blocked diamine salts.

A sample heated to 150° C. required 8 minutes to cure. The cured composition had a Shore A hardness of 25, and a minimal mild non-offensive odor.

A cured sample placed in a 150° C. oven for 24 hours to evaluate its thermal stability was darker and displayed some brittleness but was still fairly elastic.

An uncured sample was heated to 38° C. (100° F.) for 1 month. It remained uncured.

*Isostearic acid is a mixture of $C_{17}H_{35}COOH$ saturated acids, primarily of the methyl-branched series.

EXAMPLE XI

Formulation Of A One Package Heat Curable Composition Employing N-Dodecanethiol-Blocked Prepolymer And Hexamethylene Diamine Blocked With Hexanoic Acid 20.75 grams of prepolymer "A" were thoroughly mixed with 1.65 grams of hexanoic acid in a plastic beaker. 0.82 grams of liquified hexamethylene diamine were added to the beaker and thoroughly mixed. A white suspension signalled the formation of the blocked diamine, hexamethylene diammonium dihexanoate.

A sample heated to 150° C. required fifteen minutes to cure. The cured composition had a Shore A hardness of 35, but gave off a disagreeable odor.

A cured sample placed in a 150° C. oven for 24 hours to evaluate its thermal stability was slightly darker but had retained its elasticity.

EXAMPLE XII

Formulation Of A One Package Heat Curable Composition Employing N-Dodecanethiol-Blocked Prepolymer And Hexamethylene Diamine Blocked With Decanoic Acid 25.64 grams of prepolymer "A" were mixed with 3.03 grams of warmed, liquified decanoic acid in a plastic beaker. 1.02 grams of warmed, liquified hexamethylene diamine were added to the reaction mixture, which was then thoroughly mixed. A milky suspension signalled the formation of the blocked diamine, hexamethylene diammonium didecanoate.

A sample heated to 150° C. required 8 minutes to cure. The cured composition had a Shore A hardness of 30. Neither the uncured nor the cured samples gave off a disagreeable odor.

A cured sample was placed in a 150° C. oven for 24 hours to evaluate thermal stability. The sample had darkened but retained its elasticity.

EXAMPLE XIII

Formulation Of A One Package Heat Curable Composition Employing N-Dodecanethiol-Blocked Prepolymer And Hexamethylene Diamine Blocked With Carbamic Acid 23.16 grams of prepolymer "A" were mixed with 1.89 grams of hexamethylenediaminedicarbamate, commercially available from E. I. duPont de Nemours & Co., Wilmington, Del. 19898, under the trademark DIAK®#1.

A sample heated to 150° C. required 10 minutes to cure and displayed severe foaming.

Table II summarizes the rapid cure times and good "hot storage" stability of heat curable compositions in which both reactants are thermally blocked, as represented by Examples VIII through XIII in which the hexamethylene diamine blocking agents is varied:

TABLE II

| Example | Diamine Blocking Agent | Cure time at 150° C. | Hot Storage | Remarks |
|---|---|---|---|---|
| VIII | Oleic Acid | Less than 10 minutes | 1 week | |
| IX | Stearic Acid | 8 minutes | 3 weeks | |
| X | Isostearic Acid | 8 minutes | 4 weeks | |
| XI | Hexanoic Acid | 15 minutes | — | disagreeable odor |
| XII | Decanoic Acid | 8 minutes | — | |
| XIII | Carbamic Acid | 10 minutes | — | severe foaming |

In Examples XIV through XVI ethylene diamine is substituted for hexamethylene diamine as the curing agent, and various amine blocking agents are evaluated.

EXAMPLE XIV

Formulation Of A One Package Heat Curable Composition Employing N-Dodecanethiol-Blocked Prepolymer And Ethylene Diamine Blocked With Isostearic Acid 6.29 grams, a five percent excess, of isostearic acid (a complex mixture of isomers of stearic acid, primarily of the methyl branched series, that are mutually soluble and virtually inseparable) were thoroughly mixed with 32.74 grams of warmed, liquified prepolymer A in a plastic beaker. 0.63 grams of ethylene diamine were added to the reaction mixture, which was then thoroughly mixed. A milky suspension signalled the formation of the blocked diamine salts.

A sample heated to 150° C. required 8 minutes to cure. The cured sample had a Shore A hardness of 23.

An uncured sample displayed superior "hot storage" stability. It remained uncured and stable for over four weeks at 38° C. (100° F.).

A cured sample was placed in a 150° C. oven to evaluate thermal stability. The sample had darkened, but was still flexible, after 24 hours of exposure.

EXAMPLE XV

Formulation Of A One Package Heat Curable Composition Employing N-Dodecanethiol-Blocked Prepolymer And Ethylene Diamine Blocked With Octanoic Acid 34.43 grams of prepolymer "A" were thoroughly mixed with 3.35 grams (a five percent excess) of octanoic acid in a plastic beaker. 0.67 grams of ethylene diamine were added to the reaction mixture, which was then thoroughly mixed. A milky suspension signalled the formation of the blocked diamine salt, ethylene diammonium octanoate.

A sample heated to 150° C. required 8 minutes to cure. The cured sample had a Shore A hardness of 30, and exhibited a disagreeable odor.

A cured sample was placed in a 150° C. oven for 24 hours to evaluate its thermal stability. The sample darkened and became brittle. This poor thermal stability may be due to suspected impurities in the commercial sample of octanoic acid employed in this Example.

EXAMPLE XVI

Formulation Of A One Package Heat Curable Composition Employing N-Dodecanethiol-Blocked Prepolymer And Ethylene Diamine Blocked With Acetic Acid 39.98 grams of prepolymer "A" were thoroughly mixed with 1.62 grams (a five percent excess) of acetic acid in a plastic beaker. 0.77 grams of ethylene diamine were added to the reaction mixture, which was again thoroughly mixed.

A sample heated to 150° C. required 10 minutes to cure. The cured sample had a Shore A of 30, an elongation of about 100, but exhibited a disagreeable odor.

A cured sample was placed in a 150° C. oven for 24 hours to evaluate its thermal stability. The sample retained its elasticity.

An uncured sample maintained at 38° C. (100° F.) remained uncured for over three weeks.

Table III summarizes the results obtained in Examples XIV through XVI using ethylene diamine as the polyamine curing agent:

TABLE III

| Example | Diamine Blocking Agent | Cure time at 150° C. | Hot Storage | Remarks |
|---|---|---|---|---|
| XIV | Isostearic Acid | 8 minutes | 4 weeks | |
| XV | Octanoic | 8 minutes | | disagreeable odor* |
| XVI | Acetic Acid | 10 minutes | over 3 weeks | disagreeable odor |

*May be due to suspected impurities in commercial octanoic acid.

Example XVII evaluates a third diamine curing agent, while Examples XVIII and XIX evaluate a combination of two diamine blocking agents.

EXAMPLE XVII

Formulation Of A One Package Heat Curable Composition Employing N-Dodecanethiol-Blocked Prepolymer And Bis(p-aminocyclohexyl) Methane Blocked With Isostearic Acid 32.17 grams of prepolymer "A" were thoroughly mixed with 6.18 grams (a five percent excess) of isostearic acid in a plastic beaker. 2.17 grams of bis(p-aminocyclohexyl) methane were added to the reaction mixture which was again thoroughly mixed. A milky suspension signalled the formation of the blocked diamine salts.

A sample heated to 150° C. required 8 minutes to cure. The cured composition had a Shore A hardness of 22, and exhibited a mild odor.

An uncured sample heated to 38° C. (100° F.) remained uncured for about ten days.

A cured sample was placed in a 150° C. oven to evaluate thermal stability. The sample had darkened, but was still flexible after 24 hours of exposure.

EXAMPLE XVIII

Formulation Of A One Package Heat Curable Composition Employing N-Dodecanethiol-Blocked Prepolymer And Ethylene Diamine Blocked With A Combination Of Isostearic Acid and Decanoic Acid 7.84 grams of decanoic acid were liquified and mixed with 1.57 grams of isostearic acid, thereby producing a room temperature liquid comprising 89 mole percent decanoic acid and 11 mole percent isostearic acid. There was some minor crystallization of the decanoic acid after the solution stood overnight. This solution was labelled "combination blocking agent I."

38.75 grams of prepolymer "A" were mixed with 4.81 grams (a five percent excess) of the combination blocking agent I in a plastic beaker. 0.75 grams of ethylene diamine were added to the reaction mixture, which was again mixed thoroughly. A milky suspension signalled the formation of the blocked diamine salts.

A sample heated to 150° C. required 8 minutes to cure. The cured composition had a Shore A hardness of 22, but gave off a slightly disagreeable odor.

A cured sample placed in a 150° C. oven for 24 hours to evaluate its thermal stability darkened but retained its flexibility.

An uncured sample was heated to 38° F. (100° F.) for six weeks. It remained uncured.

EXAMPLE XIX

Formulation Of A One Package Heat Curable Composition Employing N-Dodecanethiol-Blocked Prepolymer And Ethylene Diamine Blocked With A Combination Of Isostearic Acid And Decanoic Acid 7.68 grams of warmed, liquified decanoic acid were mixed with 2.30 grams of isostearic acid, thereby producing a room temperature liquid comprising 84.6 mole percent decanoic acid and 15.4 mole percent isostearic acid. After standing for two days there was no crystallization of the decanoic acid. This solution was labelled "combination blocking agent II."

34.26 grams of prepolymer "A" were mixed with 4.37 grams (a five percent excess) of combination blocking agent II in a plastic beaker. 0.66 gram of ethylene diamine was added to the reaction mixture, which was again thoroughly mixed. A milky suspension signalled the formation of the blocked diamine salts.

A sample heated to 150° C. required 8 minutes to cure. The cured composition had a Shore A hardness of 30 and a minimal amount of disagreeable odor.

A cured sample placed in a 150° C. oven for 24 hours to evaluate its thermal stability darkened but retained its elasticity.

We claim:

1. A composition comprising
   (A) the reaction product, at temperatures below about 100° C., of
      (i) an isocyanate-terminated prepolymer
      (ii) an isocyanate blocking agent, and
   (B) the reaction product, at temperatures below 100° C., of
      (i) an aliphatic polyamine curing agent
      (ii) a polyamine blocking agent.

2. The composition of claim 1 wherein the polyamine blocking agent is selected from the group comprising sodium bisulfite, sodium bisulfate, p-toluene sulfonic acid, sulfamic acid, and mixtures thereof.

3. The composition of claim 1 wherein the polyamine blocking agent is selected from the group comprising cis-9-octadecenoic acid, n-octadecanoic acid, isostearic acid, decanoic acid, hexanoic acid, ethanoic acid, and mixtures thereof.

4. The composition of claim 1 wherein the aliphatic polyamine curing agent is selected from the group comprising ethylene diamine, hexamethylene diamine, and bis(p-aminocyclohexyl) methane.

5. The composition of claim 1 wherein the isocyanate blocking agent is selected from the group consisting of n-dodecanethiol and phenol.

6. The composition of claim 1 wherein the isocyanate-terminated prepolymer is polybutadiene.

7. The composition of claim 1 wherein the isocyanate-terminated prepolymer is polysulfide.

8. A composition comprising
   (A) the reaction product, at temperatures below about 100° C., of
      (i) an amine-terminated prepolymer
      (ii) an amine blocking agent, and
   (B) the reaction product, at temperatures below about 100° C., of
      (i) a polyisocyanate curing agent
      (ii) a polyisocyanate blocking agent.

9. The composition of claim 8 wherein the amine blocking agent is selected from the group comprising sodium bisulfite, sodium bisulfate, p-toluene sulfonic acid, sulfamic acid, and mixtures thereof.

10. The composition of claim 8, wherein the amine blocking agent is selected from the group comprising cis-9-octadecenoic acid, n-octadecanoic acid, isostearic acid, decanoic acid, hexanoic acid, and mixtures thereof.

11. The composition of claim 8 wherein the polyisocyanate curing agent is selected from the group consisting of ethylene diisocyanate, hexamethylene diisocyanate, p-phenylene diisocyanate, 4,4'-diphenylenemethane diisocyanate, and cyclohexylene-1,4-diisocyanate.

12. The composition of claim 4 wherein the polyisocyanate blocking agent is selected from the group comprising n-dodecanethiol and phenol.

* * * * *

UNITED STATES PATENT AND TRADEMARK OFFICE
CERTIFICATE OF CORRECTION

PATENT NO. : 4,430,489
DATED : Feb. 7, 1984
INVENTOR(S) : John H. MacMillan et al.

It is certified that error appears in the above-identified patent and that said Letters Patent is hereby corrected as shown below:

Column 2, line 61, parentheses -- ( -- should be before Aug.

Column 3, line 14, parentheses -- ( -- should be before Jan.

Column 10, line 34, change "agents" to --agent--.

Column 14, Claim 12, line 1, change "4" to --8--.

Signed and Sealed this

Thirteenth Day of August, 1991

Attest:

HARRY F. MANBECK, JR.

*Attesting Officer*     *Commissioner of Patents and Trademarks*